Nov. 18, 1947.    A. H. SCHUTTE    2,431,143
FIBROUS CATALYST SYSTEM
Filed Aug. 26, 1943    2 Sheets-Sheet 1
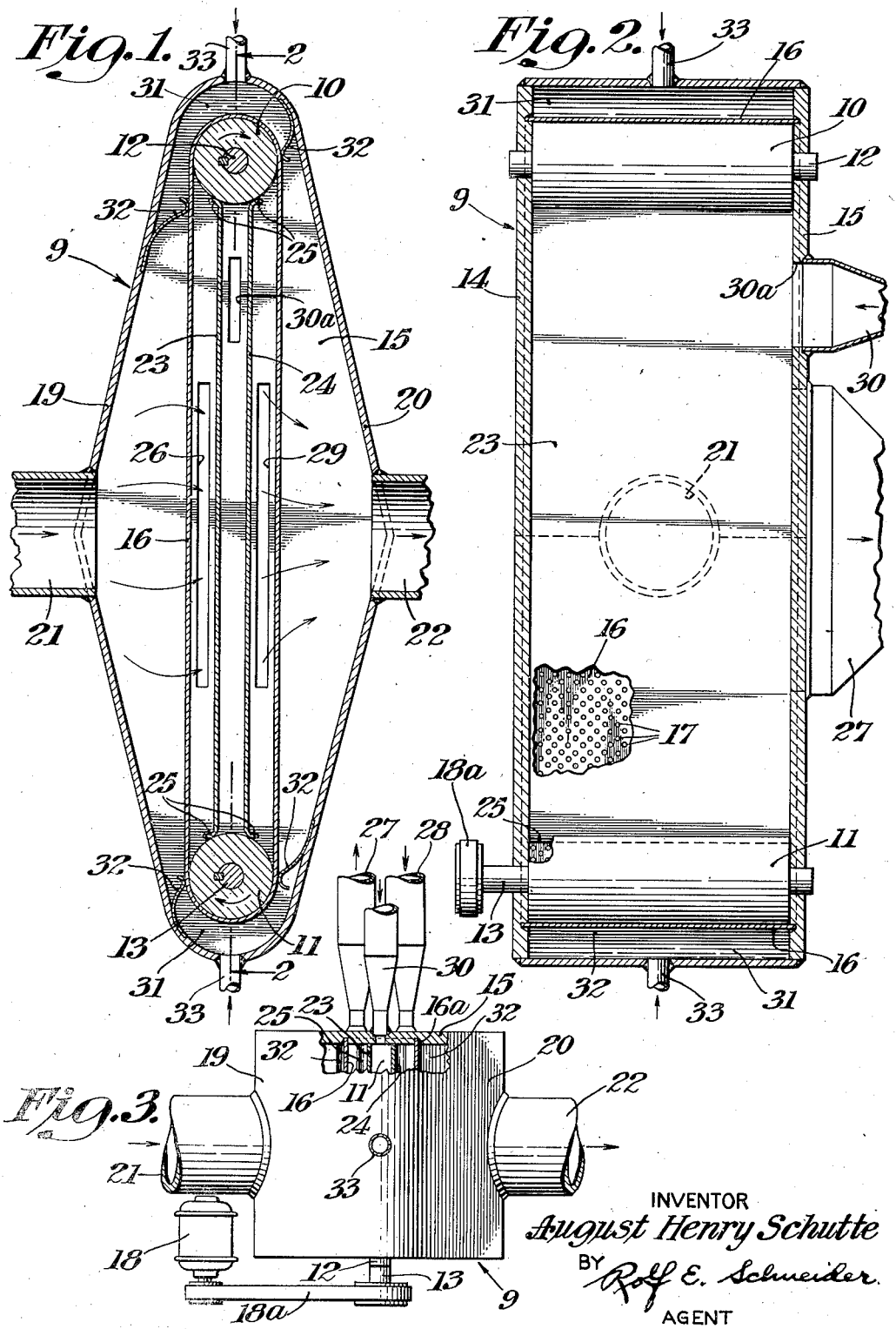
INVENTOR
August Henry Schutte
BY Rolf E. Schneider
AGENT

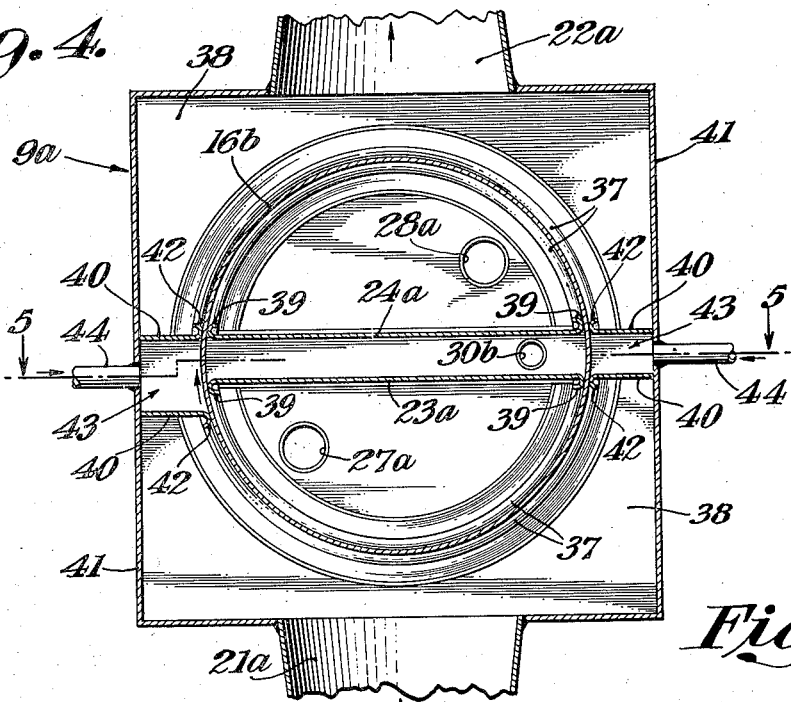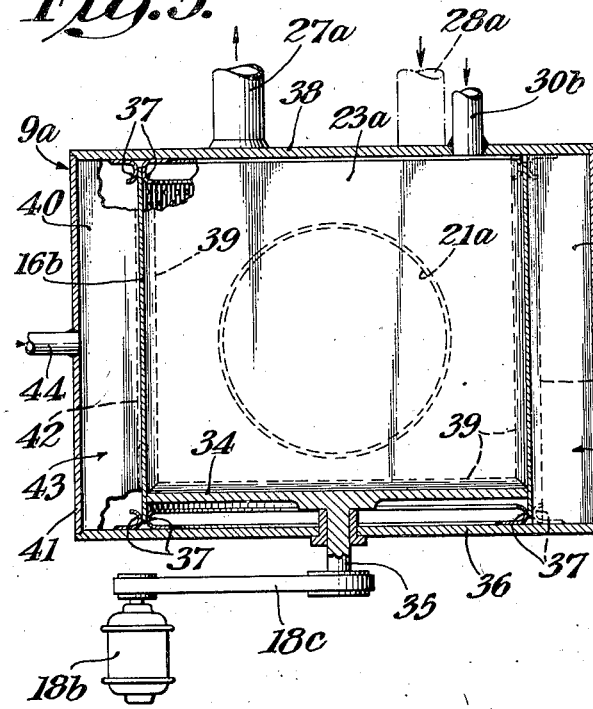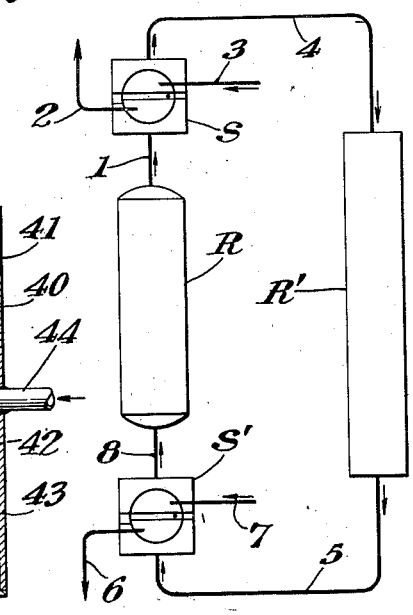

Patented Nov. 18, 1947

2,431,143

UNITED STATES PATENT OFFICE 2,431,143

FIBROUS CATALYST SYSTEM

August Henry Schutte, Hastings on Hudson, N. Y., assignor to The Lummus Company, New York, N. Y., a corporation of Delaware Application August 26, 1943, Serial No. 500,085

2 Claims. (Cl. 23—1)

This invention relates to the transference of finely divided solid material between zones which are required to be maintained under different gaseous conditions and especially to the transference of a fibrous catalyst between the reaction zone and the reactivation zone in a continuous catalytic reaction system. More particularly, the invention relates to the transference between such zones of a fibrous catalyst such as that disclosed in my copending application, Serial No. 478,473, filed March 8, 1943 and entitled "Catalyst."

An important object of the invention is to provide for continuous transference of a finely divided solid material such as a fibrous solid material or the like between different zones in an improved manner with maintenance of a required or desired difference in gaseous conditions between the zones.

Another important object of the invention is to provide for such transference of finely divided solid material by the employment of different gas streams, one to bear the material in suspension continuouslly from one of the zones to the point of separation and the other to receive the separated material and bear it in suspension continuously to the other zone, and to provide for continuous passage of the material from the first stream to the second stream without gas exchange between the streams.

Still another important object of the invention is to provide for the transference of the finely divided material from one stream to the other stream by employment at the point of separation of a continuously moving endless screen to collect thereon the material delivered to such point by the stream from one of the zones and to carry the collected material into the path of the other stream for discharge of the material from the screen and conveyance of the material in suspension in the other stream to the other zone, and to provide for sealing of the streams from each other to prevent gas exchange therebetween as the material is transferred from one stream to the other by the screen.

A further important object of the invention is to provide, in a continuous catalytic reaction system, apparatus for continuous transference of a finely divided catalyst between a reaction zone and a reactivation zone by the respective streams of reaction gases and reactivation gases and for transfer of the catalyst from stream to stream without gas exchange therebetween, whereby a required difference in gaseous conditions between such zones may be maintained.

Other objects and advantages of the invention will appear hereinafter.

In the drawings,

Fig. 1 is a vertical central sectional view of one form of device for continuously separating finely divided material in suspension from a gaseous stream conducted from one zone to the point of separation and for continuously transferring the separated material to another gaseous stream for delivery by the latter in suspension to another zone;

Fig. 2 is a sectional view taken along the line 2—2 of Fig. 1, with parts broken away;

Fig. 3 is a top plan view, upon a reduced scale, of the device shown in Figs. 2 and 3;

Fig. 4 is a view similar to Fig. 1 and shows a modified form of the separating device;

Fig. 5 is a sectional view taken along the line 5—5 of Fig. 4; and

Fig. 6 is a diagrammatic view of a continuous catalytic conversion and reactivation system embodying the invention.

In my aforesaid copending application, Serial No. 478,473, the employment of a catalyst or catalyst carrier of fibrous material in a moving catalyst system for the conversion of hydrocarbons or the like is disclosed. As stated in such application, the catalyst or catalyst carrier may consist of a natural fibrous mineral such as asbestos, or it may consist of fibers of wool prepared from slag, glass, or rock. Synthetic fibers prepared from catalytically active gels such as silica gels may also be employed. As pointed out in such application, the purposes of employing a catalyst or catalyst carrier of fibrous character are to prevent abrasion of the mechanical equipment of the conversion system and to prevent poisoning of the catalyst by contamination thereof with metal picked up from the equipment by such abrasion.

The present invention is directed more particularly to the provision of satisfactory method and means for transferring such a fibrous catalyst or catalyst carrier continuously from a catalytic conversion or reaction zone to a catalyst reactivation zone and from the latter zone continuously back to the conversion zone while maintaining a desired difference in gaseous conditions between said zones and for facilitating the handling and separation of the catalyst from the streams of gaseous reaction products and reactivation gases, respectively.

According to the invention, a gaseous stream of reaction products bearing the fibrous catalyst in suspension is directed against a transversely-positioned continuously moving endless screen within one region around the course of the latter. The screen separates the catalyst fibers from the stream and bears the catalyst fibers to another region around the course of the screen. Within the latter region the catalyst fibers are blown from the screen by another gaseous stream consisting of part or all of the reactivation gases flowing transversely therethrough and are conveyed thereby in suspension to the catalyst reactivation zone. Seals are provided to prevent gas exchange between the streams in order to maintain a desired difference in gaseous conditions between the zones. In a similar manner reactivated catalyst is passed in suspension by a continuous gaseous stream from the reactivation zone, separated in a similar manner by another continuously moving endless screen, and then continuously passed in suspension from the screen to the conversion zone by another gaseous streams consisting of all or a part of the reactants to be converted, these two streams being also sealed from each other.

Heretofore, in processes for the conversion of hydrocarbons or the like employing a finely divided catalyst in suspension within a gaseous stream, the catalyst has been of a granular or powdered material of relatively high specific gravity. It is customary to separate such a catalyst from a gaseous stream by the employment of a so-called "cyclone" separator whereby the catalyst is separated from the stream by centrifugal force. The present invention provides for more efficient separation of such a finely divided catalyst and more particularly provides a novel catalyst separating system which is especially suited to the handling of a fibrous catalytic material.

In the conversion system, diagrammatically illustrated in Fig. 6, R indicates a reactor defining a catalytic conversion zone, and R' indicates a kiln or other suitable means defining a catalyst reactivation zone. A line 1 leads from the conversion zone to a separating device S for continuous delivery to the latter of a gaseous stream of conversion or reaction products bearing spent catalyst in suspension, and a line 2 leads from such separating device to continuously conduct away the reaction products after separation of the spent catalyst therefrom. Another line 3 delivers continuously to separating device S a stream of regenerating or reactivating gas to pick up the separated spent catalyst and carry it in suspension continuously through a line 4 to the reactivation zone R'. Through a line 5, the reactivated catalyst is continuously borne in suspension by the gaseous stream of combustion products to a separating device S'; and, after separation of the reactivated catalyst from such stream, the latter is continuously discharged from the separating device through a line 6. A line 7 leads to the device S' for continuous delivery of a gaseous stream of reactants to be converted, and a line 8 leads from this device to the conversion zone R for continuous delivery of the latter stream with the reactivated catalyst in suspension therein to the conversion zone. The separating devices S and S' may be of either the form shown in Figs. 1, 2, and 3 or the form shown in Figs. 4 and 5.

The separating device shown in Figs. 1, 2, and 3 will be first described as employed in the position of the separator S of Fig. 6. The device includes a vertically elongated, gas-tight casing 9 desirably rectangular in cross section. Rolls 10 and 11 are located within the upper and lower end portions respectively of the casing and are keyed respectively upon shafts 12 and 13 journalled in bearings in the opposite parallel side walls 14 and 15 of the casing. An endless screen 16 is trained over these rolls. Preferably, this screen comprises a flexible sheet metal web perforated, as indicated at 17, over all of its area except narrow edge margins thereof or a woven wire cloth or the like. The screen is wider than the rolls, and its edge margins desirably slidably fit within grooves 16a formed in the casing walls 14 and 15 for sealing effect. An electric motor 18 is operatively connected as by means of belt 18a to the shaft 13 of roll 11, for example, for continuously moving the screen.

The casing 9 has dished opposite walls 19 and 20 opposed to the opposite reaches of the screen extending between the rolls. A delivery conduit 21 is connected to the wall 19 at a central point of the latter, for example, and opens therethrough into the casing. Similarly, a discharge conduit 22 is connected to the wall 20 at a central point of the latter, for example, and opens therethrough to the casing. It will be appreciated that conduits 21 and 22 may be connected to casing 9 at any points suitable for the respective purposes. A partition structure extends between the rolls and comprises a pair of plates 23 and 24 in spaced parallel relation to each other. Along their opposite side edges, these plates are rigidly secured to the casing walls 14 and 15. The upper and lower edge margins 25 of the plates are flexible and resilient and bear against the peripheries of the rolls for sealing effect. Between the partition plate 23 and the adjacent reach of the screen, the casing wall 15 has an elongated discharge port 26 opening into a conduit 27 connected to the wall 15. A gas delivery conduit 28 is connected to wall 15 and opens into the casing through an elongated port 29 in the wall located between the partition plate 24 and the adjacent reach of the belt. A gas delivery conduit 30 is also connected to this wall and opens into the casing through an elongated port 30a located between the partition plates 23 and 24 to charge the space between the plates with a sealing gas preferably under pressure.

Within the upper and lower end portions of the casing two pairs of flexible and resilient sealing strips 32 are secured along one edge thereof to the interior of the casing. Each of these strips has a free edge pressed, by the resilience of the strip, against the portion of the screen passing over the roll adjacent the strip. The strips of each pair, together with the roll and the adjacent end wall of the casing, define a chamber 31. Through pipes 33 connected to the casing, the chambers 31 are charged with a sealing gas also desirably under pressure. One of the upper sealing strips 32 is so located, as shown in Fig. 1, as to expose a portion of the screen which is out of contact with the adjacent roll to the sealing gas so that such gas can pass through this portion of the screen.

Assuming the separating device just described to be located at the position indicated at S in Fig. 6, the conduits 21, 27, 28, and 22 form the lines 1, 2, 3, and 4, respectively, of Fig. 6. A continuous gaseous stream of reaction products bearing the spent catalyst in suspension from the conversion zone is delivered by conduit 21 to the continuously moving screen 16. The spent catalyst so delivered is caught by the screen while the gas of the stream passes through the screen and is discharged through the conduit 27 for disposal as desired. Pressure conditions are so adjusted in the reactor R and at the discharge end of conduit 27 that a pressure differential is maintained between the inner and outer faces of the screen whereby the spent catalyst is caused to cling to the screen and pass therewith under the yielding upper sealing strip 32 (at the left with reference to Fig. 1) and into the upper chamber 31. There the spent catalyst is held pressed against the screen by the sealing gas under pressure within the chamber. From the chamber the spent catalyst is passed by the screen under the yielding sealing strip 32 (at the right in Fig. 1). Immediately after passing under the latter strip, the spent catalyst is subjected to the force of a continuous stream of regenerating gas entering the casing through the port 29. This stream passes outwardly through the screen, blows the spent catalyst therefrom, and bears it in suspension to the reactivation zone R'.

The sealing strips 32, the partition structure with its sealing edges 25, and the sealing gas under pressure within the chambers 31 and within the space between the partition plates 23 and 24 effectually separate the gaseous stream entering the casing through the conduit 21 from the gaseous stream entering the casing through the port 29 and prevent exchange of gas between the streams. In addition, because of the location of the upper left sealing strip 32 in Fig. 1, the sealing gas in the upper chamber 31 can pass through the spent catalyst carried by the screen 16 into the discharge conduit 27 and can thereby purge the spent catalyst of any retained reaction products so that loss thereof can be substantially prevented. A suitable inert material is used as the sealing gas so that contamination of the reaction products is avoided. It will be appreciated that the sealing gas is maintained under a higher pressure than that prevailing in the remainder of casing 9 so that the desired sealing effect can be provided.

In the employment of a similar separating device in the position indicated at S' in Fig. 6, the conduits 21, 27, 28, and 22 form the lines 5, 6, 7, and 8, respectively, of Fig. 6. The device there functions in the manner just described to separate the reactivated catalyst delivered by a continuous stream of gaseous combustion products from the reactivation zone R', to transfer the separated reactivated catalyst to a continuous gaseous stream of reactants to be converted for delivery thereby to the conversion zone R, and to seal such streams from each other to prevent gas exchange therebetween.

In the modified form of the separating device shown in Figs. 4 and 5, the endless screen, here designated 16b, is in the form of a cylindrical, perforated metal web. A box-like casing 9a encloses the screen. The cylindrical screen has, near one end thereof, a transverse wall 34. A stub shaft 35 is affixed to this wall and journalled within a bearing in an adjacent wall 36 of the casing. A motor 18b is operatively connected to this shaft as by means of belt 18c for rotating the screen continuously. The edge margins of the screen slidably fit between opposed arcuate sealing strips 37, each secured at one edge thereof to the interior of the casing and having a free edge portion bearing against the screen. These strips are flexible and resilient, and they press against the screen to prevent gas flow between the edges of the screen and the opposite walls 36 and 38 of the casing. Within the screen there is a partition structure extending diametrically of the screen and comprising a pair of spaced parallel plates 23a and 24a. These plates are secured to the wall 38 of the casing to render the partition structure rigid within the casing. The margins 39 of the plates, at the inner surface of the screen and at the inner surface of the transverse wall 34 of the screen unit, are desirably flexible and resilient as shown and press against these surfaces for sealing engagement therewith. External to the screen and directly opposite the ends of this partition structure, there are pairs of parallel partition plates 40. These plates are secured at their outer edges to opposite walls 41 of the casing, and the inner edge margins 42 of these plates are also desirably flexible and resilient and press against the outer surface of the screen for sealing engagement therewith. The plates 40 of each pair define therebetween a chamber 43 in register with the diametrical space between the partition plates within the screen. The chambers 43 are charged through pipes 44 with sealing gas under pressure. As shown in Fig. 4, the lower one of the plates 40 at the left is spaced downwardly out of register with partition plate 23a to admit sealing gas into the space within the screen traversed by the stream of reaction products. This gas serves to purge the reaction products from the spent catalyst, for example, carried by the screen in the manner indicated above in connection with Figs. 1, 2, and 3. It will be understood that the yielding and resilient strips 42 are so adjusted as to provide sealing means for the rotary screen 16b without causing dislodgment of the spent catalyst which it carries.

A gas discharge conduit 27a is connected to the wall 38 of the casing 9a and opens into a space surrounded by the screen 16b and the partition plate 23a. A gas delivery conduit 28a is also connected to the wall 38 and opens into a space surrounded by the screen and the partition plate 24a. Another gas delivery conduit 30b is also connected to this casing wall and opens into the space between the partition plates 23a and 24a. A gas delivery conduit 21a is connected to the casing at a point opposite the portion of the screen which is in communication with the discharge conduit 27a, and a gas discharge conduit 22a is connected to the casing at a point opposite the portion of the screen which is in communication with the gas delivery conduit 28a.

Separating devices of the modified form just described may be employed at the points S and S' of Fig. 6. There, these devices function similarly to the devices of the form first described. A continuous gaseous stream bearing the catalyst in suspension from one of the zones is conducted through the conduit 21a to the outer surface of one section of the screen 16b. The catalyst is caught by the continuously moving screen, and the gas of the stream passes through the screen and out through the conduit 27a. The pressure differential maintained across the screen holds the deposited catalyst upon the screen, and the latter carries the catalyst past the yielding lower sealing edge 42 (appearing at the left in Fig. 4). Within the first chamber 43 the catalyst is held to the screen by sealing gas under pressure within the chamber. The screen then moves the catalyst past the following sealing edge 42. Thereupon, the catalyst is subjected to the outward force of the continuous gaseous stream entering through the conduit 28a. This stream blows the catalyst from the screen and bears it in suspension to the other zone. The partitions with their sealing edges together with the sealing gas under pressure within the chambers 43 and within the space between the partition plates 23a and 24a seal the catalyst delivery stream and the catalyst receiving stream from each other and prevent exchange of gas therebetween. The pressure of the sealing gas within the chambers 43 is maintained higher than that in conduits 21a and 22a to provide the desired sealing effect, and the sealing gas within the space between the partition plates 23a and 24a is maintained at an intermediate pressure in order that the catalyst may be carried upon the screen through the chambers 43.

It will be understood that the sealing of the two zones represented by conduits 21a and 22a is produced by the joint action of the sealing strips 37—37, 42—42 and the sealing gas supplied under pressure to chambers 43—43 and to the chamber defined by partition plates 23a and 24a. All of these sealing strips may be in mechanical sealing relation to the screen web 16b with the exception of the strips 42—42 on the left-hand side of the apparatus, as shown in Figs. 4 and 5, which should bear only lightly against the web or the mat of fibers deposited thereon. In fact, the rounded margins of these strips 42—42 may be spaced out of contact with the screen in order to permit more free passage of the mat of fibers beneath the strips. Consequent escape of inert sealing gas from the pocket or chamber 43 will not be objectionable since it is common for such gas to mingle with the gaseous reaction products in a catalyst purging operation. In Fig. 4 the lower wall 40 of the chamber is shown as lowered to admit inert gas through the catalyst to the stream of reaction products for purging effect. When the strips are thus spaced from the screen, minor irregularities or lack of uniformity in the thickness of the mat of fibers upon the screen will be accommodated by the inherent flexibility and resiliency of the sealing strips, and the passage and leakage of reaction gases at these points will be effectively prevented by the superior pressure of the sealing gas in chamber 43. It will be understood that the average thickness of the deposit of catalyst upon the screen can be readily controlled by controlling the speed of rotation of the screen. The sealing gas serves also to prevent the passage of gases between the catalyst delivery stream and the catalyst receiving stream at the remaining points where the sealing strips directly engage the outside and the inside of the web 16b.

My invention is applicable to any type of continuous catalytic vapor-phase reaction involving substantially any type of catalyst although it finds particular application to the catalytic conversion of hydrocarbons such as cracking, reforming, polymerization, dehydrogenation, alkylation, isomerization, desulfurization, and the like. It can be used with any type of catalytic reaction involving the suspension of the catalyst in a stream of gases and is particularly applicable to the use of a fibrous catalyst which can be suspended in and carried along by a gaseous stream. The term "catalyst" as used in the specification and the claims includes any material which is catalytic per se and also any inert material which serves as a carrier for catalytic material and is coated or impregnated therewith. It is also to be noted, furthermore, that my invention is not necessarily limited to the separation of catalytic material from gaseous streams but is applicable to the separation of finely divided solid contact material suspended in a gaseous stream for substantially any purpose.

It will be seen that my invention provides for efficient separation of finely divided catalyst from a gaseous stream and also provides for effectual maintenance of a desired pressure differential or other desired difference in gaseous conditions between a zone from which the catalyst is discharged and a zone receiving the discharged catalyst.

While I have disclosed several satisfactory forms of embodiment of my invention, the invention is not limited to the specific embodiments and details disclosed but includes such changes as come within the scope of the appended claims.

I claim:

1. In a continuous catalytic reaction process employing a catalyst comprising short discrete fibers and wherein the fibers are continuously passed in suspension by gaseous media between a reaction zone and a reactivation zone, the improvement which comprises continuously removing the fibers from the gas leaving the reaction zone by passing said gas through a continuously moving endless screen in a first zone to deposit the fibers thereon, moving the fibers on the screen from the first zone into a second zone separated from said first zone by an intermediate zone containing an inert gas under greater pressure than the gases in said first and second zones, and removing the fibers in said second zone by forcing a gas through the screen to suspend the fibers in said second zone for passing to the reactivation zone, said intermediate zone being separated from said first and second zones by wall portions clearing the screen sufficiently to permit the passage of a deposit of fibers on the screen but not permitting the passage of gas thereinto against the greater opposing pressure of the inert gas in the intermediate zone, thereby preventing gas exchange between said first and second zones.

2. Apparatus for removing finely divided fibrous material suspended in a first gas from said gas and resuspending said material in a second gas, which comprises, in combination, a casing; a cylindrical screen mounted for rotation within the casing; members forming a hollow partition, interrupted by the screen so that said screen can rotate therethrough, and extending from one wall portion to the opposite wall portion of the casing and bisecting the cylindrical space within the screen, the members of said partition lying between the external surface of the screen and the casing wall having sufficient clearance therewith and being so arranged as to permit passage of a web of fiber on the screen but to prevent the passage of gas against greater opposing pressure of gas within the hollow partition, said hollow partition and said screen defining two chambers in the space within the screen and two outer chambers in the space around the screen; an inlet in said casing into one of said outer chambers for the gas suspension of fiber; an outlet from the inner chamber separated therefrom by the screen for discharge of fiber-free gas therefrom; an inlet into the other of said inner chambers for entry of the second gas; an outlet through said casing from the other outer chamber for the second gas bearing suspended fiber; and an inlet for admission of a gas under pressure into the space within the hollow partition.

AUGUST HENRY SCHUTTE.

REFERENCES CITED

The following references are of record in the file of this patent:

UNITED STATES PATENTS

| Number | Name | Date |
|---|---|---|
| 1,270,216 | Saunders | June 18, 1918 |
| 1,724,982 | Trumble | Aug. 20, 1929 |
| 1,862,839 | Brelsford | June 14, 1932 |
| 2,302,807 | Shoeld | Nov. 24, 1942 |
| 2,322,075 | Tyson | June 15, 1943 |

FOREIGN PATENTS

| Number | Country | Date |
|---|---|---|
| 23,045 | Great Britain | Aug. 24, 1911 |